(12) United States Patent
Atin (10) Patent No.: US 11,213,918 B2
(45) Date of Patent: Jan. 4, 2022

(54) ARC WELDING

(71) Applicant: Acergy France SAS, Suresnes (FR)

(72) Inventor: Kouassi Gnamien Cesar-Auguste Atin, Glasgow (GB)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 16/768,623

(22) PCT Filed: Nov. 26, 2018

(86) PCT No.: PCT/IB2018/001481
§ 371 (c)(1),
(2) Date: May 29, 2020

(87) PCT Pub. No.: WO2019/106430
PCT Pub. Date: Jun. 6, 2019

(65) Prior Publication Data
US 2020/0376602 A1  Dec. 3, 2020

(30) Foreign Application Priority Data
Nov. 30, 2017  (GB) ...................... 1719991

(51) Int. Cl.
| | |
|---|---|
| *B23K 26/34* | (2014.01) |
| *B23K 9/09* | (2006.01) |
| *B23K 26/348* | (2014.01) |
| *B23K 26/354* | (2014.01) |
| *B23K 26/70* | (2014.01) |
| *B23K 9/095* | (2006.01) |
| *B23K 9/16* | (2006.01) |
| *B23K 9/173* | (2006.01) |

(Continued)

(52) U.S. Cl.
CPC .......... *B23K 26/348* (2015.10); *B23K 9/0956* (2013.01); *B23K 9/164* (2013.01); *B23K 9/173* (2013.01); *B23K 9/235* (2013.01); *B23K 26/354* (2015.10); *B23K 26/706* (2015.10); *B23K 10/022* (2013.01); *B23K 2101/10* (2018.08)

(58) Field of Classification Search
CPC ...... B23K 9/164; B23K 9/173; B23K 9/0956; B23K 9/235; B23K 26/348; B23K 26/354; B23K 26/706; B23K 2101/10
See application file for complete search history.

(56) References Cited

U.S. PATENT DOCUMENTS

| | | |
|---|---|---|
| 4,507,540 A | 3/1985 | Hamasaki |
| 6,906,281 B2 | 6/2005 | Musselman |

(Continued)

FOREIGN PATENT DOCUMENTS

| | | |
|---|---|---|
| DE | 102012218931 | 4/2014 |
| EP | 1 454 701 | 9/2004 |

(Continued)

*Primary Examiner* — Brian W Jennison
(74) *Attorney, Agent, or Firm* — Levy & Grandinetti (57) ABSTRACT

A weld is formed in a workpiece such as a pipeline by first activating a melting device, such as a laser, to form a molten weld pool in the workpiece and then activating a welding device, such as a GMAW torch, to initiate a weld in the weld pool. The weld therefore incorporates the weld pool homogeneously. Relative movement between the activated welding device and the workpiece continues and completes the weld while the melting device remains deactivated.

32 Claims, 5 Drawing Sheets

(51) Int. Cl.
*B23K 9/235* (2006.01)
*B23K 101/10* (2006.01)
*B23K 10/02* (2006.01)

(56) References Cited

U.S. PATENT DOCUMENTS

| | | |
|---|---|---|
| 8,471,173 B2 | 6/2013 | Miessbacher et al. |
| 2009/0134133 A1* | 5/2009 | Mokadem .............. B23K 26/60 |
| | | 219/121.64 |
| 2010/0276402 A1 | 11/2010 | Richard et al. |
| 2016/0105933 A1* | 4/2016 | Jones ................... B23K 31/003 |
| | | 219/601 |

FOREIGN PATENT DOCUMENTS

| | | |
|---|---|---|
| EP | 1 581 359 | 10/2005 |
| EP | 1 907 161 | 4/2008 |
| JP | 2001-239368 | 9/2001 |
| JP | 2002-248571 | 9/2002 |
| JP | 5294573 | 9/2013 |

\* cited by examiner

ARC WELDING

This invention relates to the art of arc welding, for example as used to make circumferential girth welds between abutting steel pipe joints when fabricating subsea pipelines. In particular, the invention is concerned with improving the quality of arc welds while accelerating the overall welding process.

In conventional automatic arc welding, the arc of a welding torch firstly creates a puddle or pool of molten metal before relative movement between the torch and the workpiece displaces the arc along a joint to be welded. For example, when fabricating pipelines or other tubular workpieces, a welding torch may be supported by a welding bug that moves circumferentially along a rail extending around the workpiece. In some circumstances, it is also possible for a workpiece to be moved relative to a stationary welding torch.

As the metal of the workpiece is initially cold, the weld pool is non-uniform or inhomogeneous because it contains various metallic phases and possibly even gas bubbles. Also, the weld pool often leaves a local bead at the initiation point that has to be ground off in a subsequent operation. The time taken to do so may be disadvantageous, especially if welding lies on the critical path of a stepwise assembly process. More importantly, any discontinuities in the weld may impact adversely upon the strength or fatigue performance of the joint.

Background art to the invention lies in hybrid welding techniques. Hybrid welding involves substantially simultaneous welding by two different methods, such as combinations of metal inert gas (MIG) welding and plasma welding, or MIG welding and laser beam welding (LBW). For example, EP 1581359 discloses hybrid MIG/plasma welding in which a MIG torch and a plasma torch are used together to combine the advantages of MIG welding, notably its wide breadth of weld coverage, with the advantages of plasma welding, notably its depth of weld penetration. The MIG torch and the plasma torch are active simultaneously.

Hybrid welding is also described in EP 1907161, in which a LBW system is combined with a MIG torch that deposits the weld passes. The two welding devices may be offset for simultaneous welding or may be arranged to pass successively with a slight delay between them to effect welding and re-welding.

Another method of hybrid welding is described in U.S. Pat. No. 4,507,540, in which a MIG torch is used in combination with laser welding. The MIG torch first melts the joint portion of the substrates that are to be joined and then the laser is focused on the bottom surface of the crater created by the MIG torch such that deep penetration of the weld is achieved.

In another hybrid welding method described in U.S. Pat. No. 8,471,173, the main welding device is a LBW system while the secondary welding device is a MIG torch. In this case, the arc is formed only intermittently because the electrode wire of the MIG torch is retracted when a droplet appears and is deposited on the workpiece. JP 5294573 also discloses simultaneous laser welding and MIG welding, the laser system being the main welding device. Shielding gas is injected between the two welding devices in order to shield the laser weld.

In U.S. Pat. No. 6,906,281, a laser beam precedes a MIG torch to pre-clean the weld area by vaporising a zinc coating on a plate. Again, the laser beam and the torch are active simultaneously.

In US 2016/0105933, an induction heating coil is positioned in front of a welding torch. The induction heating coil is used to heat a localised area of the workpiece directly in front of the welding torch such that more heat from the welding torch may be used to heat the welding wire thus increasing the rate of the weld.

In DE 102012218931, a plasma beam that is generated by a TIG welding torch is used to heat a base material before an MSG burner is ignited to complete the weld. Again, the plasma beam and MSG burner are active simultaneously during the welding method.

In JP 2002248571, a method of welding is described that combines laser and arc welding. In this document the laser is again active throughout the duration of the weld.

JP 2001239368 describes a welding method that combines the use of TIG and MIG welding. The TIG torch is used to initiate a weld before switching to a MIG torch. Simultaneous or near-simultaneous welding by hybrid welding devices addresses the problem of creating a deep or wide weld quickly along a joint. However, none of the aforementioned prior art methods address the problem of the appearance and quality of the weld pool at the point of weld initiation.

Against this background, the invention provides a method of welding that comprises: activating a secondary melting device to form a molten weld pool in a workpiece; activating a primary welding device to initiate a weld in the weld pool; and effecting relative movement between the activated primary welding device and the workpiece to continue the initiated weld while the secondary melting device is deactivated. The initiated weld can be completed while the secondary melting device remains deactivated throughout.

The deactivated secondary melting device is protected from thermal radiation emitted by the activated primary welding device. A barrier is moved into a blocking position between the deactivated secondary melting device and the activated primary welding device, suitably in response to deactivation of the secondary melting device.

The primary welding device and the secondary melting device are in fixed relation during said relative movement between the activated primary welding device and the workpiece. The primary welding device and the secondary melting device may both be supported by a common support structure such as a welding bug or robot arm that is moved relative to the workpiece.

The secondary melting device may be activated to form the weld pool in a shielding atmosphere defined by a flow of shielding gas directed at the workpiece. Similarly, the weld may be initiated, continued and completed in a shielding atmosphere defined by a continuing flow of the shielding gas.

Conveniently, the weld pool may be formed in a shielding atmosphere of shielding gas flowing from the primary welding device. However, the weld pool could be formed in a shielding atmosphere of shielding gas flowing from the secondary melting device.

The weld may be formed in a shielding atmosphere of substantially the same composition as the shielding atmosphere used when forming the weld pool. Alternatively, the weld may be formed in a shielding atmosphere of a substantially different composition to the shielding atmosphere used when forming the weld pool.

The primary welding device may be activated in response to monitored characteristics of the weld pool.

Welding heat may be applied from the primary welding device to the workpiece before the secondary melting device is deactivated. For example, deactivation of the secondary melting device may be in response to activation of the primary welding device.

Preferably, melting heat is directed along a first axis from the secondary melting device to the workpiece and welding heat is directed along a converging second axis from the primary welding device to the workpiece. The first and second axes suitably intersect the weld pool and more preferably intersect each other in the weld pool.

Whilst the primary welding device may, individually, be capable of making an effective weld in the workpiece, the secondary melting device may, individually, be incapable of making an effective weld in the workpiece.

The primary welding device may comprises a gas metal arc welding (GMAW) torch that forms the weld by a shielded arc, whereas the secondary melting device may comprise a laser, a plasma torch or a retractable tungsten electrode that forms the weld pool via an arc.

The inventive concept also embraces a corresponding welding apparatus. That apparatus comprises: a secondary melting device for forming a weld pool at a weld initiation point; a primary welding device for forming a weld to be initiated at the weld pool; a controller that is programmed or configured to deactivate the secondary melting device and to activate the primary welding device to complete the weld with the secondary melting device remaining deactivated and a barrier that is moveable, on deactivation of the melting device, into a blocking position between the deactivated melting device and the activated welding device wherein the welding device and the melting device are mounted together on a common supporting structure for movement relative to a workpiece.

Where the secondary melting device is arranged to direct melting heat to a workpiece along a first axis and the primary welding device is arranged to direct welding heat to the workpiece along a second axis that converges with the first axis, the primary welding device may be arranged to direct a flow of shielding gas toward the workpiece to intersect the first axis.

Advantageously, the primary welding device and the secondary melting device may share a common power supply.

The invention seeks to remove or to mitigate a discontinuity at the point of weld initiation by separating the initial creation of a weld pool from a subsequent welding operation as such. Whilst the invention uses principles that are superficially similar to those of hybrid welding, the design is modified and required power is lower. This is because secondary spot heating is applied only temporarily to create the weld pool and is then turned off during welding along the joint.

Thus, in the invention, two welding devices are mutually exclusive. The secondary torch is a low-energy device that is present only to supply enough heat to initiate the weld so that the arc of the main torch starts by welding hot liquid metal, not cold solid metal.

In preferred embodiments, the invention provides a method for initiating shielded arc welding, the method comprising: positioning a shielded arc welding torch electrode near an interface to be welded; locally melting that interface to make a pool using a secondary welding apparatus; when the pool is established and stabilised, triggering the arc; and welding along the interface, where the secondary welding apparatus is stopped and protected from weld heat, for example by a barrier such as a shutter, once the arc is triggered. Such a shutter may be closed automatically when the arc is triggered.

Shielded arc welding may involve MIG or MAG (metal active gas) methods, thus using a consumable electrode. Conversely, the secondary welding apparatus may employ a laser beam such as a blue laser, a plasma torch or a tungsten rod, such as is used in a gas tungsten arc welding (GTAW) or tungsten inert gas (TIG) torch. The secondary welding apparatus could instead employ an induction heating coil although this is not preferred. More generally, the secondary welding apparatus may employ micro-plasma welding and may use micro-power, hence requiring low electric power and only a small quantity of plasma gas and/or shielding gas.

The arc may be activated by a welder or weld operator or may be triggered automatically, for example by monitoring the temperature and homogeneity of the weld pool. More generally, the arc may be triggered automatically when the condition of the weld pool reaches a predetermined status, for example as may be monitored by an infrared sensor. The secondary welding apparatus may stop automatically when the arc is activated. Conversely, secondary arc welding may be activated upon extinction of the arc for finishing the weld.

A shielding gas may be used during pool formation before the arc is activated. Conveniently, the shielding gas may be the same as the gas used for the shielded arc welding.

Preferred embodiments of the invention also provide a welding torch that comprises a MIG or MAG torch and a secondary welding apparatus, wherein the secondary welding apparatus is stopped when or just before the MIG or MAG arc is triggered. A shutter protects the secondary apparatus when the arc is on, preferably by closing automatically upon arc triggering.

The welding torch suitably also comprises a weld pool condition sensor that triggers the arc and disables or stops the secondary apparatus.

Conveniently, the same power supply may provide power to both welding devices.

Thus, the invention provides a novel torch for automatic welding processes that may be applicable to a welding bug or a welding robot. The invention avoids the need to grind the weld start and weld stop areas when proceeding with mechanised or automatic welding processes like MAG, MIG and their derivatives, as used to make structural welds and pipeline girth welds.

The welding tool of the invention can be fitted onto all available bugs or robot arms. It significantly improves the quality and reliability of girth welds when executed by conventional bugs and also allows the application of multiple robot arms to a pipe.

Thus, in accordance with the invention, a weld is formed in a workpiece such as a pipeline by firstly activating a melting device, such as a laser, to form a molten weld pool in the workpiece and then activating a welding device, such as a GMAW torch, to initiate a weld in the weld pool. The weld therefore incorporates the weld pool homogeneously. Relative movement between the activated welding device and the workpiece continues and completes the weld while the melting device remains deactivated.

In order that the invention may be more readily understood, reference will now be made, by way of example, to the accompanying drawings, in which.

Referring firstly to the first embodiment shown in FIGS. 1a to 1e, a welding apparatus in accordance with the invention is shown here in conjunction with a workpiece 12 that comprises a joint to be welded. The welding apparatus 10 and the workpiece 12 are supported for automated relative movement to perform a weld pass automatically along the joint.

For ease of illustration, the workpiece 12 is shown here as a flat plate, such that relative movement between the welding apparatus 10 and the workpiece 12 follows a straight path. However, the workpiece 12 will often be curved, for example where pipe joints are brought together to fabricate a subsea pipeline. In that case, relative movement between the welding apparatus 10 and the workpiece 12 would follow a similarly curved path. Also, in that case, the weld will typically extend back to the initiation point following a full circuit of the abutting pipe joints.

The welding apparatus 10 comprises a primary welding device 14 and an auxiliary or secondary melting device 16 that is suitably held in fixed relation to the primary welding device 14. Conveniently, therefore, the primary welding device 14 and the secondary melting device 16 are fixed beside each other to a common support structure 18. That support structure 18 may be, or may be supported by, a welding bug or a robot arm.

The primary welding device 14 is exemplified here by a conventional GMAW torch for performing MIG or MAG welding. In that case, the workpiece 12 is typically connected electrically to ground.

Figure 1A:
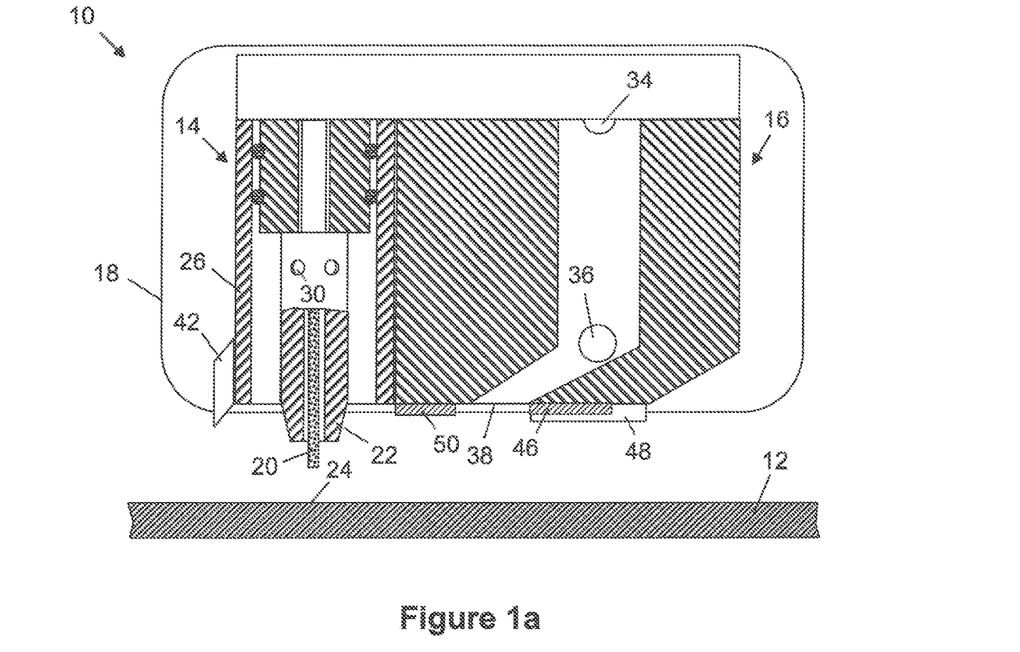
FIGS. 1a to 1e are a sequence of schematic part-sectioned side views of a welding apparatus in accordance with a first embodiment of the invention, firstly forming a weld pool in a workpiece and then arc-welding along a joint using that weld pool as an initiation point.

FIG. 1a shows the welding apparatus 10 brought into an operational position close to the workpiece 12. The primary welding device 14 comprises a consumable electrode 20 that is advanced within a contact tube or tip 22. The welding apparatus 10 is positioned to bring the electrode 20 into alignment with a desired weld initiation point 24 on the workpiece 12.

Figure 1B:
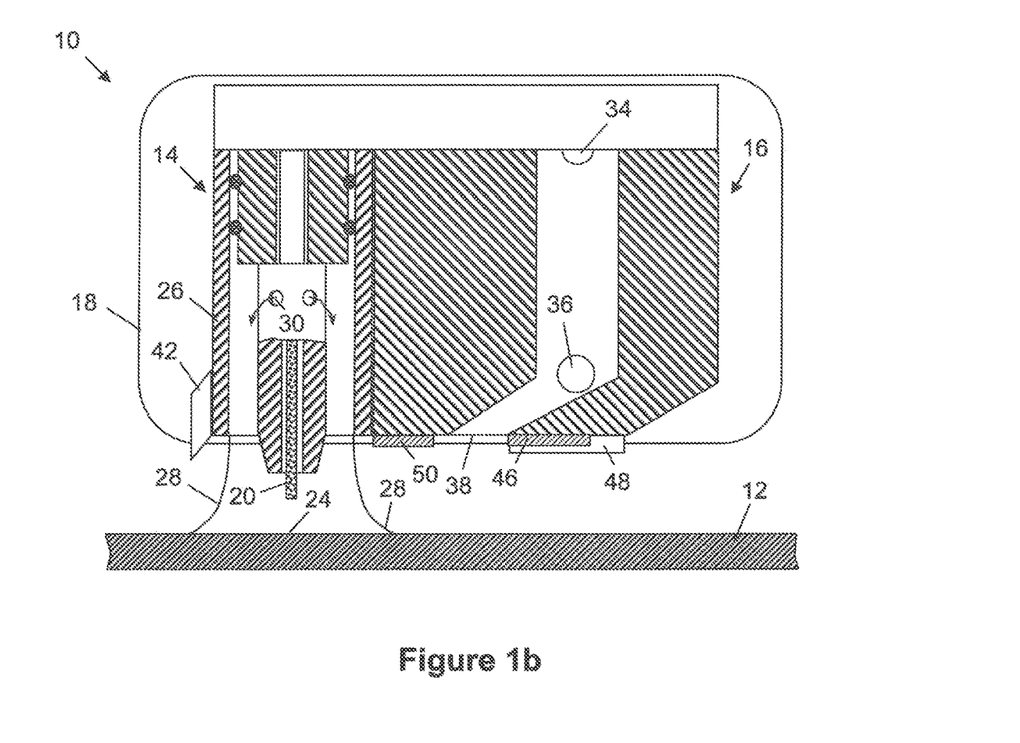

The contact tip 22 is supported within a concentric shroud or nozzle 26 that then directs a flow of shielding gas 28 toward the workpiece 12 as shown in FIG. 1b. The flow of shielding gas 28 could, for example, emanate from holes 30 in the contact tube 22 as shown. The skilled reader will understand that the shielding gas 28 may be selected from a wide range of options depending upon the material(s) of the workpiece and the parameters of the weld.

Figure 1C:
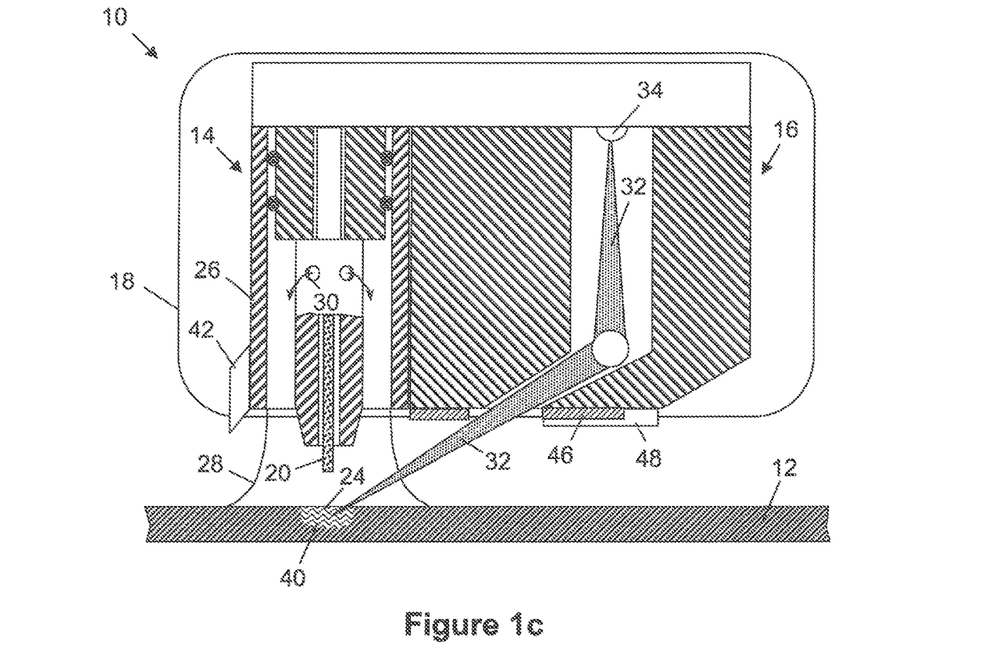

With the flow of shielding gas 28 now creating a shielding atmosphere that surrounds and protects the initiation point 24 from ambient air, the secondary melting device 16 is activated as shown in FIG. 1c. In this example, the secondary melting device 16 is a low-power LBW device that generates a laser beam 32 from a laser 34 and directs and focuses that beam 32 through optics 36 and an aperture 38 to impinge upon the workpiece 12 at the initiation point 24. Thus, the laser beam 32 emerges from the aperture 38 of the secondary melting device 16 on a path that intersects a longitudinal axis projecting toward the workpiece from the electrode 20.

The laser beam 32 heats and locally melts the workpiece 12 around the initiation point 24 to form a weld pool 40. The shielding gas 28 surrounds and shields the weld pool 40 from ambient air.

The temperature and other characteristics of the weld pool 40 are monitored by an infra-red weld pool sensor 42 that is conveniently supported by the welding apparatus 10 as shown. When the weld pool 40 has been established and stabilised, the system is ready for welding to begin by activating the primary welding device 14 as shown in FIG. 1d.

Figure 1D:
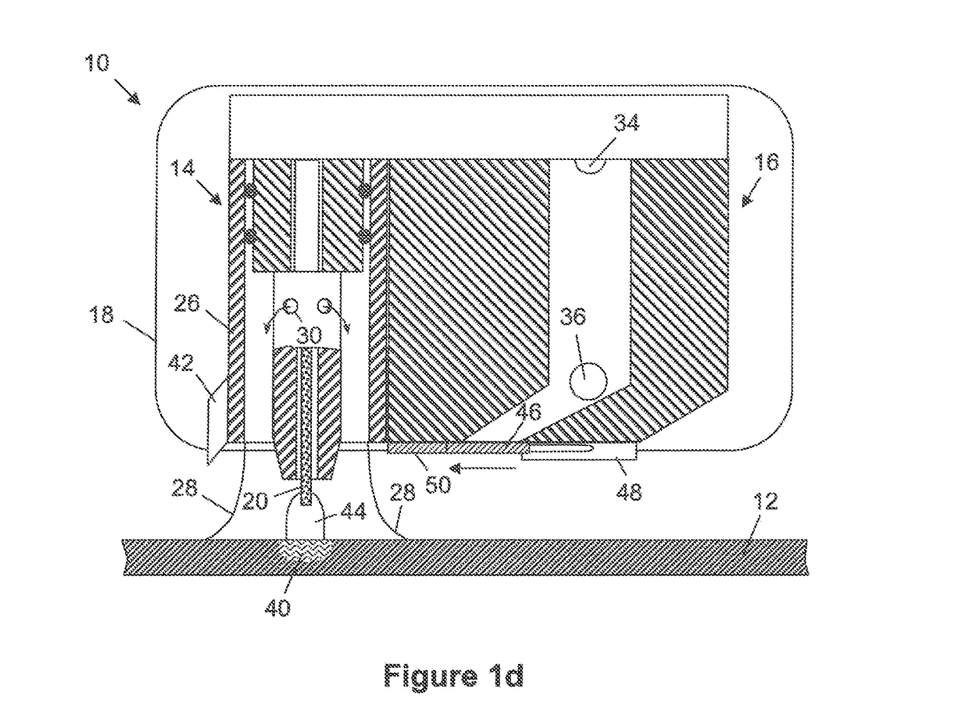

When the primary welding device 14 is activated as shown in FIG. 1d, an arc 44 is established between the electrode 20 and the workpiece 12 via the weld pool 40. Thus, the primary welding device 14 initiates welding in the already-molten and homogeneous weld pool 40. This avoids or mitigates the discontinuities that bedevil weld initiation in prior art welding techniques.

Elegantly, the shielding gas 28 flowing from the primary welding device 14 not only protects the weld pool 40 while the secondary melting device 16 is active but also surrounds the arc 44 to protect the weld itself. The same composition of shielding gas 28 could be used for both purposes, or the composition of the shielding gas 28 could be varied from one operation to the next. In any event it is advantageous for the shielding gas 28 to flow continuously and without interruption as the welding apparatus 10 switches from forming the weld pool 40 to forming the weld.

When the primary welding device 14 is activated, the secondary melting device 16 is deactivated to turn off the laser 34. For example, establishment of the arc 44 could be sensed as the trigger for deactivating the secondary melting device 16. Alternatively establishment of the arc 44 could be triggered immediately upon deactivation of the secondary melting device 16. Either way, the arc 44 is established before the weld pool 40 cools significantly. Also, the aperture 38 is closed to protect the laser 34 and the optics 36 from electromagnetic radiation emitted from the arc 44.

In the examples shown, the aperture 38 is closed by a shutter 46 that is driven by a shutter drive mechanism 48 to slide across the aperture 38. In the closed position shown in FIG. 1d, the shutter 46 bears against a stop 50. Sliding or translational movement of the shutter 46 is convenient as shown. However, the shutter 46 could instead pivot relative to the welding apparatus 10 so as to close the aperture 38 by rotating about any suitable axis.

The establishment and stability of the arc 44 may be determined by the weld pool sensor 42 and/or by monitoring fluctuations in current or voltage in the power supply of the primary welding device 14. When the arc 44 has been established and stabilised, welding can begin by effecting relative movement between the welding apparatus 10 and the workpiece 12 as shown in FIG. 1e.

Figure 1E:
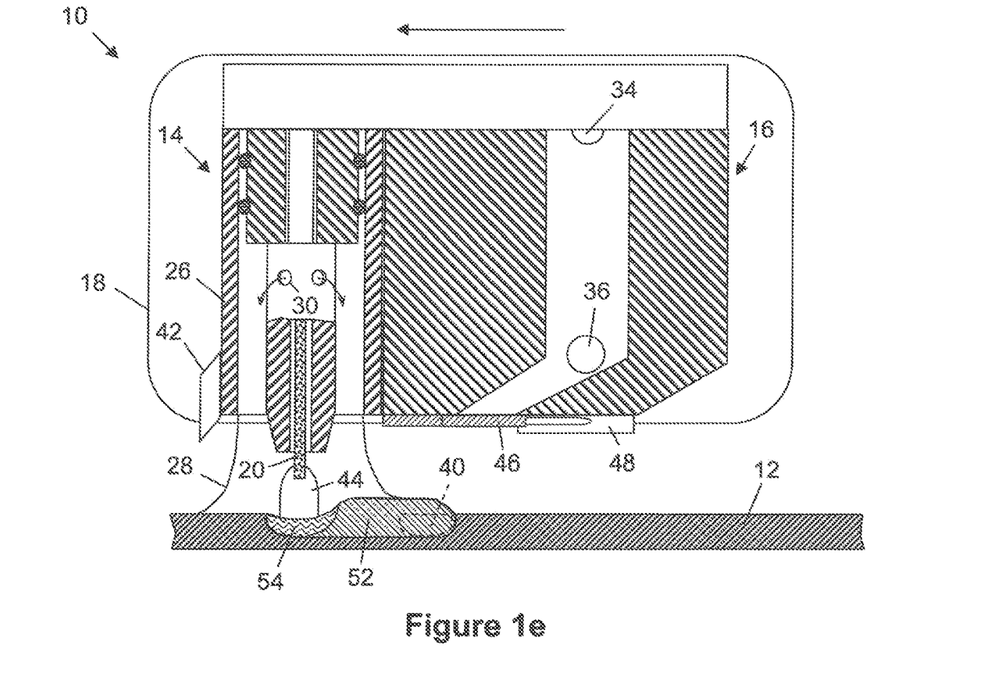

The relative movement between the welding apparatus 10 and the workpiece 12 creates a weld 52 that incorporates the original weld pool 40, whose previous position is shown in FIG. 1e in dashed lines. Advantageously, therefore, the original weld pool 40 becomes a substantially homogeneous part of the weld 52 itself. The weld 52 is formed from the advancing electrode 20 and the material of the workpiece 12, which melt together into a new weld pool 54 ahead of the weld 52.

Welding continues until the weld 52 is complete and the welding apparatus 10 reaches a termination point on the workpiece 12. The primary welding device 14 is then deactivated and the flow of shielding gas 28 is turned off.

As noted above, it is possible for the weld 52 to return to the initiation point 24 and therefore to be endless, most commonly when forming a circumferential girth weld when fabricating a pipeline. In that event, there will be some re-welding at a termination point coinciding with the initiation point 24.

Figure 2:
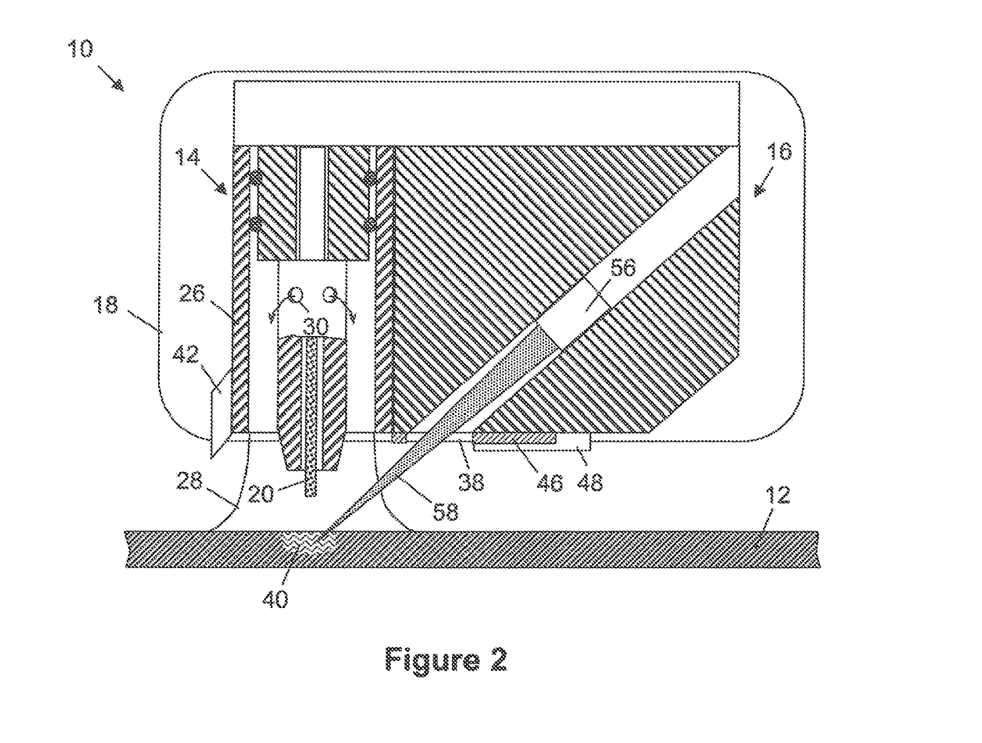
FIG. 2 is a schematic part-sectioned side view of a welding apparatus in accordance with a second embodiment of the invention, corresponding to the stage of operation shown in FIG. 1c in relation to the first embodiment.

FIG. 2 shows a second embodiment of the invention in which like numerals are used for like features. The second embodiment is shown here at the same stage as shown in FIG. 1c for the first embodiment, that is, with the flow of shielding gas 28 turned on and the weld pool 40 being formed in the workpiece 12 by the secondary melting device 16.

In FIG. 2, the stages shown in FIGS. 1a and 1b have already happened, so that the welding apparatus 10 has been positioned and the flow of shielding gas 28 has been turned on. Conversely, the stages shown in FIGS. 1d and 1e are about to happen, in which the primary welding device 14 will be active, the secondary melting device 16 will be turned off and the shutter 46 will be closed.

The second embodiment shown in FIG. 2 differs from the first embodiment shown in FIG. 1 in that the laser 34 and optics 36 of the secondary melting device 16 are replaced by a plasma arc device 56 that directs an arc or jet of hot plasma 58 at the workpiece 12 through the aperture 38. The plasma 58 heats the workpiece 12 to form the weld pool 40. When the weld pool 40 has been established and stabilised, the plasma arc device 56 is deactivated, the shutter 46 is closed and the primary welding device 14 is activated to start a weld that incorporates the weld pool 40.

Figure 3A:
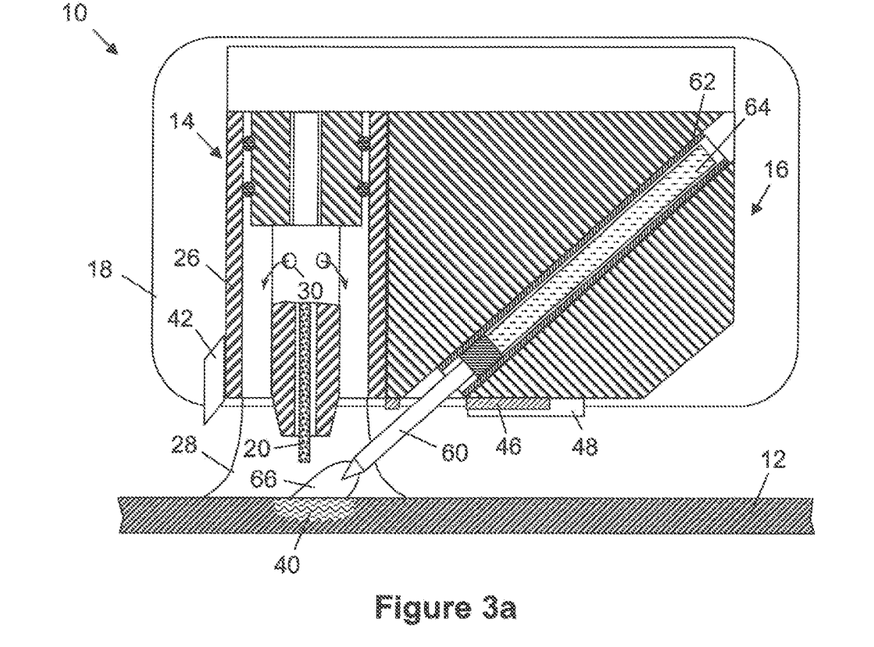
FIGS. 3a and 3b are schematic part-sectioned side views of a welding apparatus in accordance with a third embodiment of the invention, corresponding to the stages of operation shown in FIGS. 1c and 1d in relation to the first embodiment.
Figure 3B:
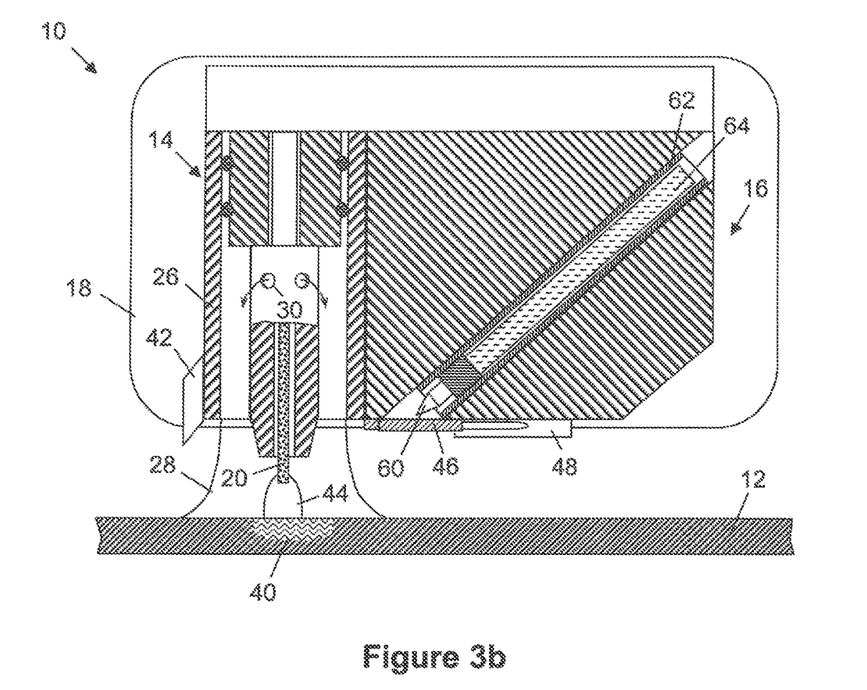

FIGS. 3a and 3b show a third embodiment of the invention in which, again, like numerals are used for like features. The third embodiment is shown here at the same stages as shown respectively in FIGS. 1c and 1d for the first embodiment. Thus, the stages shown in FIGS. 1a and 1b have already happened, so that the welding apparatus 10 has been positioned and the flow of shielding gas 28 has been turned on.

In FIG. 3a, the flow of shielding gas 28 is continuing and the weld pool 40 is being formed in the workpiece 12 by the secondary melting device 16 while the primary welding device 14 remains inactive. Conversely, FIG. 3b shows the primary welding device 14 activated, the secondary melting device 16 turned off and the shutter 46 closed.

The third embodiment shown in FIGS. 3a and 3b differs from the first and second embodiments in that the secondary melting device 16 comprises a retractable tungsten rod 60 of a type used as a non-consumable electrode in GTAW or TIG operations. The rod 60 is movable telescopically along its longitudinal axis by a drive mechanism 64 within a friction-fitted sleeve 62 in the surrounding body of the secondary melting device 16.

The rod 60 is extended by the drive mechanism 64 through the aperture 38 toward the initiation point 24 as shown in FIG. 3a. When the extended rod 60 is energised, a secondary arc 66 is established between the distal end of the rod 60 and the workpiece 12 to form a weld pool 40 as shown.

When the weld pool 40 has been established and stabilised, the rod 60 is de-energised to extinguish the secondary arc 66 and is then quickly retracted by the drive mechanism 64 into the surrounding body of the secondary melting device 16. The shutter 46 is then closed and the primary welding device 14 is activated to start a weld that incorporates the weld pool 40. It may, however, be possible to activate the primary welding device 14 before retracting the rod 60.

Advantageously, the rod 60 can retract very quickly, for example in less than 0.3 seconds, to allow the shutter 46 to be closed so that welding can begin before the weld pool 40 cools significantly. For example, the drive mechanism 64 may extend the rod 60 against the bias of a mechanical spring or a gas spring and latch the extended rod 60 against that bias, so that the rod 60 snaps back into a retracted position upon being unlatched.

Those skilled in the art will know that a tungsten electrode used in GTAW requires particular shielding gases such as pure argon. However, such shielding gases are not necessarily appropriate for forming the weld itself. Consequently, the composition of he shielding gas supplied through the primary welding device 14 could be changed as the welding apparatus 10 switches from forming the weld pool 40 to forming the weld. Alternatively, while forming the weld pool 40, a shielding gas appropriate for a tungsten electrode could be supplied through the secondary melting device 16, or indeed along the tungsten rod 60, before a different shielding gas is supplied through the primary welding device 14 for forming the weld.

Figure 4:
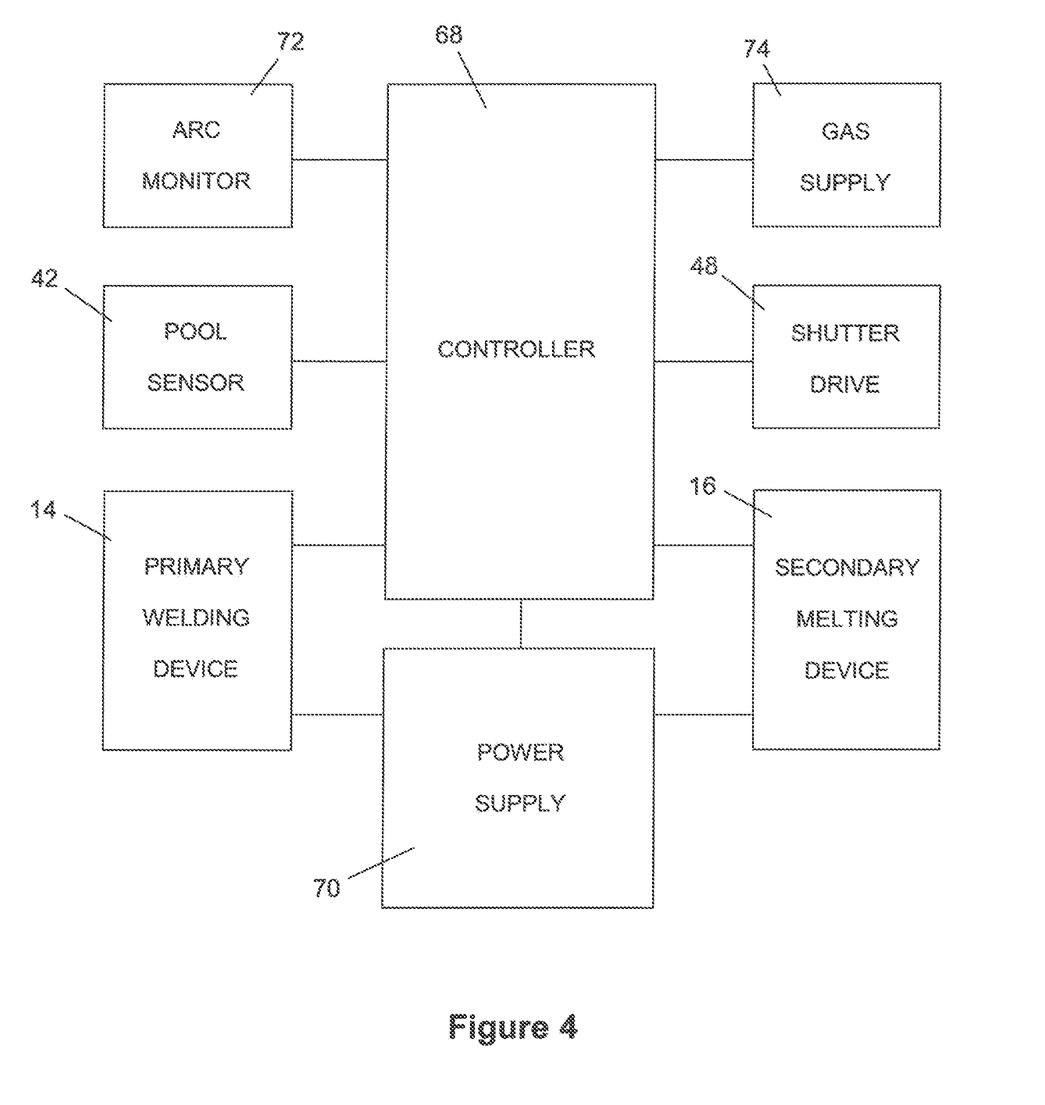
FIG. 4 is a simplified system block diagram of the welding apparatus shown in the preceding drawings.

Turning finally to FIG. 4 of the drawings, this block diagram of the welding apparatus 10 shows how a controller 68 and power supply 70 interact with other aforementioned components and functions. In particular, it will be apparent that the controller 68 takes input from the weld pool sensor 42 and an arc monitoring device 72 to control the primary welding device 14 and the secondary melting device 16 in addition to the shutter drive 48 and a shielding gas supply 74. It will also be apparent that the common power supply 70 conveniently provides electrical power to both the primary welding device 14 and the secondary melting device 16.

Many variations are possible within the inventive concept. For example, with the primary welding device turned off, the secondary melting device could be reactivated upon termination of a weld. In this way, the secondary melting device could improve the condition of all or part of the weld, such as a termination region of the weld.

The invention claimed is:

1. A method of welding a workpiece comprises:
   activating a melting device;
   forming a molten weld pool in the workpiece using the activated melting device;
   activating a welding device to initiate a weld in the weld pool;
   deactivating the melting device;
   effecting relative movement between the activated welding device and the workpiece to continue the initiated weld while the melting device is deactivated; and
   protecting the deactivated melting device from radiated heat emitted by the activated welding device by moving a barrier into a blocking position between the deactivated melting device and the activated welding device;
   wherein the welding device and the melting device are in fixed relation during said relative movement between the activated welding device and the workpiece.

2. The method of claim 1, comprising completing the initiated weld while the melting device is deactivated throughout.

3. The method of claim 1, comprising moving the barrier into the blocking position in response to deactivation of the melting device.

4. The method of claim 1, wherein the welding device and the melting device are both supported by a welding bug or robot that is moved relative to the workpiece.

5. The method of claim 1, comprising:
directing a flow of shielding gas at the workpiece;
defining a shielding atmosphere by the flow of the shielding gas; and
activating the melting device to form the weld pool in the shielding atmosphere.

6. The method of claim 5, wherein the weld is initiated and continued in the shielding atmosphere.

7. The method of claim 5, wherein the shielding gas flows from the welding device and the weld pool is formed in the shielding atmosphere, defined by the flow of shielding gas from the welding device.

8. The method of claim 5, wherein the shielding gas flows from the melting device and the weld pool is formed in the shielding atmosphere, defined by the flow of shielding gas from the melting device.

9. The method of claim 5, comprising maintaining the composition of the shielding atmosphere between forming the weld pool and initiating and continuing the weld, such that the composition of the shielding atmosphere is substantially the same when forming the weld pool as when initiating and continuing the weld.

10. The method of claim 5, comprising changing the composition of the shielding atmosphere between forming the weld pool and initiating and continuing the weld, such that the composition of the shielding atmosphere is substantially different when forming the weld pool than when initiating and continuing the weld.

11. The method of claim 1, comprising:
monitoring characteristics of the weld pool; and wherein
activating the welding device occurs in response to the monitored characteristics of the weld pool.

12. The method of claim 1, comprising applying welding heat from the welding device to the workpiece before deactivating the melting device.

13. The method of claim 12, comprising:
determining activation of the welding device; and
deactivating the melting device in response to activation of the welding device.

14. The method of claim 1, comprising:
directing melting heat along a first axis from the melting device to the workpiece; and
directing welding heat along a second axis from the welding device to the workpiece; wherein the first and second axes converge and intersect the weld pool.

15. The method of claim 1, wherein the welding device is, individually, capable of making an effective weld in the workpiece.

16. The method of claim 1, wherein the melting device is, individually, incapable of making an effective weld in the workpiece.

17. The method of claim 1, wherein the welding device comprises a GMAW torch that forms the weld by a shielded arc.

18. The method of claim 1, wherein the melting device comprises a laser or a plasma torch.

19. The method of claim 1, wherein the melting device comprises a tungsten electrode that forms the weld pool by an arc.

20. The method of claim 19, wherein the tungsten electrode is retracted upon deactivation of the melting device.

21. A welding apparatus comprises:
a melting device for forming a weld pool at a weld initiation point;
a welding device for forming a weld to be initiated at the weld pool;
a controller that is programmed to deactivate the melting device and to activate the welding device to complete the weld with the melting device remaining deactivated; and
a barrier that is movable, on deactivation of the melting device, into a blocking position between the deactivated melting device and the activated welding device;
wherein the welding device and the melting device are mounted together on a common supporting structure for movement relative to a workpiece.

22. The apparatus of claim 21, wherein:
the melting device is arranged to direct melting heat to a workpiece along a first axis; and
the welding device is arranged to direct welding heat to the workpiece along a second axis that converges with the first axis.

23. The apparatus of claim 22, wherein the welding device is arranged to direct a flow of shielding gas toward the workpiece to intersect the first axis.

24. The apparatus of claim 21, wherein the controller is responsive to a weld pool sensor to activate the welding device in response to monitored characteristics of the weld pool.

25. The apparatus of claim 21, wherein the controller is responsive to an activation sensor to deactivate the melting device in response to activation of the welding device.

26. The apparatus of claim 21, wherein the welding device and the melting device share a common power supply.

27. The apparatus of claim 21, wherein the welding device comprises a GMAW torch.

28. The apparatus of claim 21, wherein the melting device comprises a laser or a plasma torch.

29. The apparatus of claim 21, wherein the melting device comprises a tungsten electrode.

30. The apparatus of claim 29, wherein the tungsten electrode is retractable upon deactivation of the melting device.

31. The method of claim 6, wherein the melting device is deactivated after the welding device is activated.

32. The method of claim 16, wherein the monitored characteristics of the weld pool comprise the temperature and/or homogeneity thereof.

* * * * *